3,776,957
METHOD FOR REMOVING COPPER FROM AQUEOUS SOLUTIONS OF ACRYLAMIDE
John D. Newkirk, Downers Grove, Ill., assignor to Nalco Chemical Company, Chicago, Ill.
No Drawing. Filed May 15, 1972, Ser. No. 253,073
Int. Cl. C07c 103/00
U.S. Cl. 260—561 N                      2 Claims

ABSTRACT OF THE DISCLOSURE

Copper may be removed or reduced from aqueous solutions of acrylamide by treating such solutions with a water-soluble salt of orthophosphoric acid.

INTRODUCTION

Aqueous solutions of acrylamide oftentimes contain copper ions dissolved therein. One well-known use for the utilization of copper ions in conjunction with acrylamide solutions is to prevent the polymerization thereof under normal conditions of storage and handling. More recently it has been shown in U.S. Pats. 3,631,104 and 3,381,034 that copper is useful as a catalyst for producing acrylamide by the aqueous phase hydration of acrylonitrile. In using these catalytic processes which employ copper to hydrolyze acrylonitrile, the aqueous solutions of acrylamide produced oftentimes contain as much as 2–300 p.p.m. of copper ion. Before the acrylamide can be polymerized to high molecular weight polymers either with itself or with other vinyl monomers, it is essential that the copper be reduced to below 10 p.p.m.

Several methods have been propounded by the prior art for removing ionic impurities from aqueous solutions of acrylamide. Most of these schemes utilize ion exchange resins. While being effective for removing copper from acrylamide solutions, ion exchange requires that the acrylamide be present as a dilute solution and that the copper ion concentration not be too great so as to interfere with the normal operating capacity of the resin.

If it were possible to provide a simple method for removing relatively large amounts of copper ion from acrylamide solutions which would be simple to use, be economical, and most importantly not interefer with subsequent polymerization reactions of acrylamide either with itself or other monomers, an advance in the art would be afforded.

OBJECTS

Therefore, it becomes an object of the invention to provide an improved method for removing polymerization inhibiting amounts (e.g., in excess of 10 p.p.m.) of copper which are dissolved in aqueous solutions of acrylamide by a simple inexpensive technique.

Another object of the invention is to provide a method of removing copper from acrylamide solutions by chemical means which does not interfere with the ability of the acrylamide in such solutions to enter into subsequent polymerization reactions.

Other objects will appear hereinafter.

THE INVENTION

In accordance with the invention, it has been found that aqueous solutions of acrylamide which contain more than 10 p.p.m. of copper dissolved therein may be reacted with a water-soluble salt of orthophosphoric acid to reduce the copper content of such solutions to below 10 p.p.m. By using the practices of the invention, it is possible to use as little as ½ mol of the salt of orthophosphoric acid for each mol of copper present in the acrylamide solutions. Preferably at least 1–1.5 mols of the orthophosphoric acid salt is employed.

The particular salts of orthophosphoric acid which are used in the practice of the invention are sodium dihydrogen phosphate and disodium hydrogen phosphate. The salts may be added to the copper-containing aqueous acrylamide containing solutions either as dry powders or as aqueous solutions. As indicated, the amount of the orthophosphoric acid salts may be used as little ½ mol per mol of copper contained in the acrylamide solutions, although when substantial reductions in the copper content of the solutions are desired (e.g., less than 3 p.p.m.) 1–1.5 mols of the orthophosphoric acid salts should be used. The sodium salts of orthophosphoric acid described above, particularly sodium hydrogen phosphate, represent a preferred species of the invention.

The reaction between the phosphate salt and the copper contained in the aqueous acrylamide solutions proceeds almost instantaneously at room temperature providing good agitation is employed. While elevated temperatures (e.g., up to about the boiling point of the acrylamide solutions) or reaction times varying between 15 minutes to 2 hours may be used, no advantage is gained thereby. The reaction between the copper and the soluble salt of orthophosphoric acid produces an immediate dense precipitate which is readily removed by filtration, decantation, and like means from the aqueous acrylamide solutions.

Even through some phosphate ions remain in the acrylamide solution, they do not effect the subsequent polymerization of acrylamide with itself or other vinyl monomers. The content of the starting acrylamide solutions may vary from as little as 5 percent acrylamide up to as high as 50 percent by weight of acrylamide with good results being achieved in all instances.

EXAMPLES

To illustrate the invention, the following are presented by way of example.

Example 1

A 40% by weight aqueous solution of acrylamide was prepared containing 196 ml./l. of copper. To 100 ml. aliquots of this solution, trisodium phosphate, disodium hydrogen phosphate and sodium dihydrogen phosphate was added in 1, 2 and 4 times the theoretical amount to precipitate the copper in solution. The phosphate was added to the acrylamide solution and stirred. After precipitation occurred, the precipitate was filtered and the residual copper in solution measured. The results obtained are listed below:

|  | Theoretical multiple | | |
| --- | --- | --- | --- |
|  | 1 | 2 | 4 |
| Trisodium phosphate, mg | 187 | 170 | 147 |
| Disodium hydrogen phosphate, mg | 1 | 3 | 2 |
| Sodium dihydrogen phosphate, mg | 2 | 2 | 2 |

The results illustrate that disodium hydrogen phosphate and sodium dihydrogen phosphate remove up to 98% by weight of the copper in solution.

Example 2

A 40% by weight acrylamide solution was prepared as in Example 1, with the exception that the copper in solution was 181 ml./l. 100 ml. samples of the solution were treated with varying dosages of disodium hydrogen phosphate at different pH's. Results are listed below:

| Disodium hydrogen phosphate, mg. | pH | Residual copper, mg. |
| --- | --- | --- |
| 2 | 5.8 | 110 |
| 53 | 7.5 | 6.0 |
| 104 | 8.0 | 4.0 |
| 205 | 8.3 | 2.0 |

From the results above, it was determined that the pH is not a factor in the copper removal process.

I claim:

1. A method for reducing the copper content of aqueous solutions of acrylamide which contain more than 10 p.p.m. of copper dissolved therein to a copper level below 10 p.p.m. which comprises treating said solution with a water-soluble salt from the group consisting of alkali metal dihydrogen phosphates and dialkali metal hydrogen phosphates in an amount to provide at least ½ mol of said salt per mol of copper.

2. The method of claim 1 where the phosphate salt is a sodium salt and the amount used is at least one mol per mol of acrylamide.

References Cited

FOREIGN PATENTS 789,503   1/1958   Great Britain ____ 260—561 N

LEWIS GOTTS, Primary Examiner

E. G. LOVE, Assistant Examiner